April 23, 1968 R. J. HARVEY 3,379,191
NUCLEAR POWERED MECHANICAL HEART
Filed April 2, 1964 5 Sheets-Sheet 1

INVENTOR.
ROBERT J. HARVEY
BY
*James B. Tippany Jr*
ATTORNEY

April 23, 1968  R. J. HARVEY  3,379,191
NUCLEAR POWERED MECHANICAL HEART
Filed April 2, 1964  5 Sheets-Sheet 2

INVENTOR.
ROBERT J. HARVEY
BY
ATTORNEY

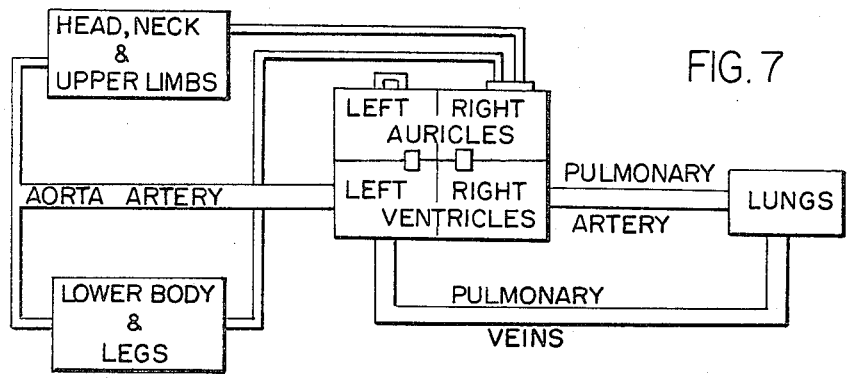
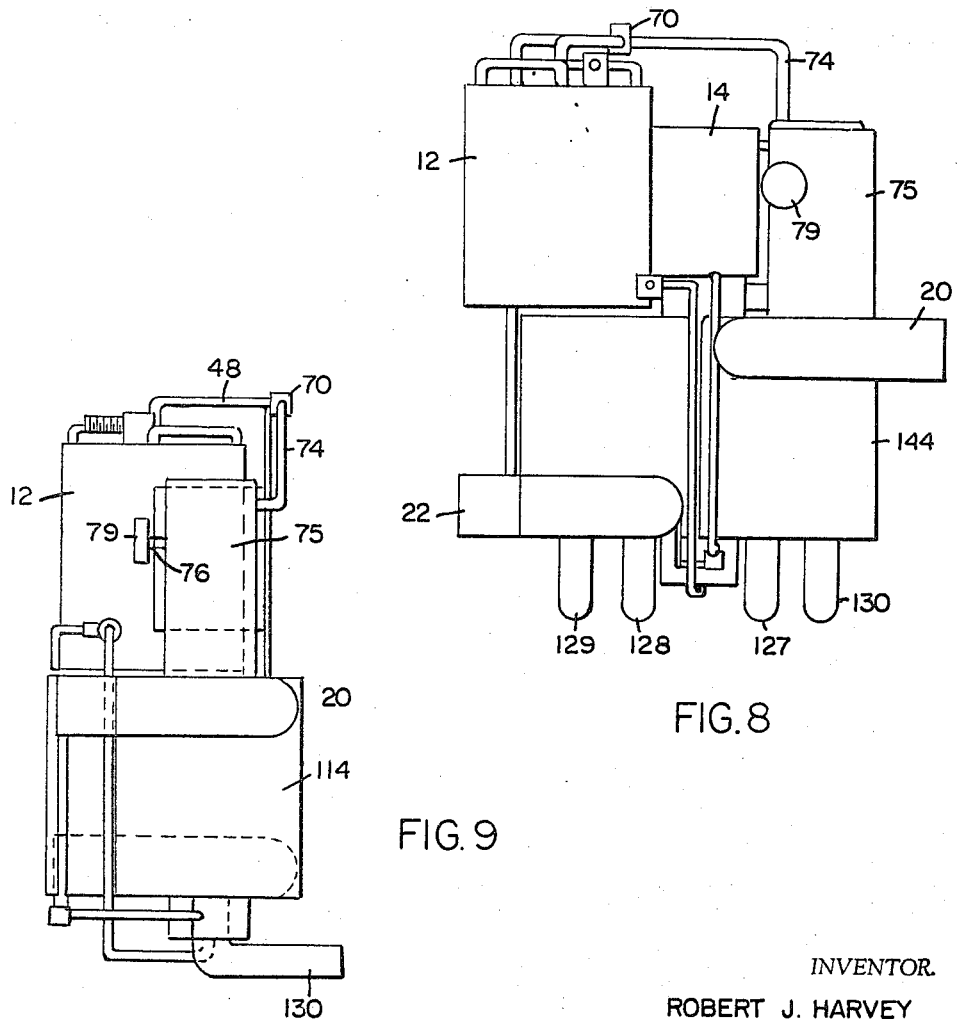

April 23, 1968 R. J. HARVEY 3,379,191
NUCLEAR POWERED MECHANICAL HEART
Filed April 2, 1964 5 Sheets-Sheet 4

INVENTOR:
ROBERT J. HARVEY
BY
ATTORNEY

April 23, 1968   R. J. HARVEY   3,379,191
NUCLEAR POWERED MECHANICAL HEART
Filed April 2, 1964   5 Sheets-Sheet 5

INVENTOR:
ROBERT J. HARVEY
BY
ATTORNEY

United States Patent Office 3,379,191
Patented Apr. 23, 1968

3,379,191
NUCLEAR POWERED MECHANICAL HEART
Robert J. Harvey, Sudbury, Mass., assignor to Thermo Electron Engineering Corporation, Waltham, Mass., a corporation of Delaware
Filed Apr. 2, 1964, Ser. No. 356,771
12 Claims. (Cl. 128—1)

ABSTRACT OF THE DISCLOSURE

A medical prosthetic device for utilization with the circulatory system of a living organism, comprising a radioisotope power source energizing a closed-cycle miniature reciprocating steam engine, with a condenser, feedwater pump, heat dissipation system, and related controls. The device, capable of total implantation within the body, activates blood pumps to circulate the blood in a physiologic manner in mammals.

---

This invention relates generally to a mechanical device and in particular to a medical prosthetic device capable of circulating blood throughout the human body in lieu of a human heart.

Various mechanical devices are in use today which enable heart surgeons to temporarily and for a limited time, by-pass the heart and permit surgery to be performed on the heart itself. However, once the surgery has been effected, the heart must take over the circulation of the blood throughout the human system. If the surgery is not effective, or the heart disease has progressed to such a point that the heart is incapable of performing its usual function, then in all probability the patient will expire. There are no known mechanical substitutes for the human heart which will enable a person having a defective heart to perform his normal activities.

Therefore, it is an object of this invention to provide a mechanical heart having its own energy source and controls, and adapted to be carried or worn by a human being.

It is a further object of this invention to provide a mechanical heart having a self-contained nuclear power source adapted to energize the prime mover of the mechanical heart.

A further object of this invention is to provide a mechanical heart adapted for use with a portable, chemical combustion system to energize the prime mover of the mechanical heart.

Other objects of this invention will in part be obvious and will, in part, appear hereinafter.

Broadly stated, the basic feature of the invention is to provide a miniature, mechanical power plant, including a boiler, having a self-contained energy source, a closed system containing a working fluid with suitable valves, feed pump, condensers and an expander capable of doing work on a pair of blood pumps which are connected to the arterial and venous blood vessel systems of the body, along with a control system for controlling the rate of work of the expander.

To the accomplishment of this and the foregoing related ends, the present invention then consists of the means hereafter fully described and particularly pointed out in the claims, the drawings and the following description, setting forth in detail certain means illustrating however, but one of the various ways in which the principle of the invention may be employed.

In the drawings:

FIG. 7 is a block diagram of the blood flow through a human body.

FIG. 8 is a view in front elevation of the mechanical heart.

FIG. 9 is a view in side elevation of the mechanical heart.

Figure 6:
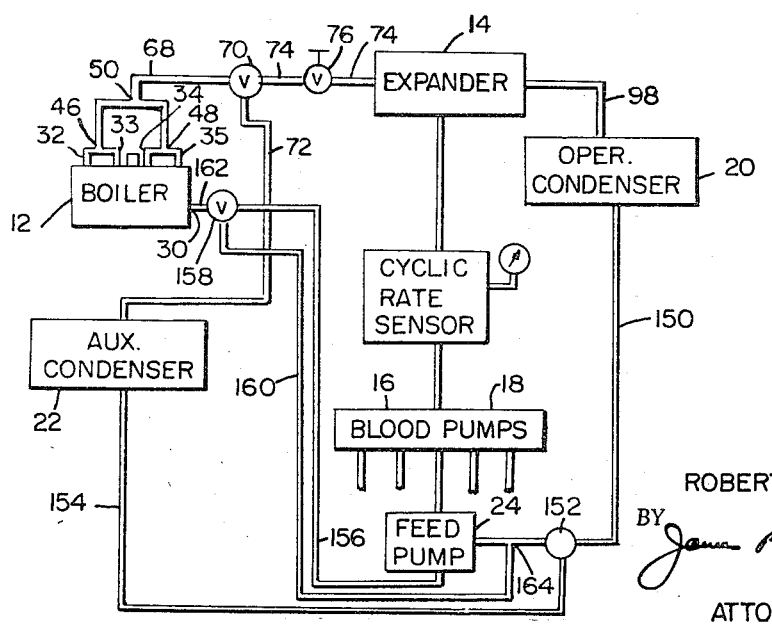
FIG. 6 is a schematic block diagram of the components of the mechanical heart.

Reference is now to be to the drawings wherein an illustrative embodiment of the mechanical heart, a construction made in accordance with the present invention and designated by the reference numeral 10. Referring to FIG. 6, the components of the mechanical heart consist primarily of a boiler, or vapor generator 12, an expander 14, a pair of blood pumps 16 and 18, a main condenser 20, an auxiliary condenser 22, and a feed pump, 24.

Figure 3:
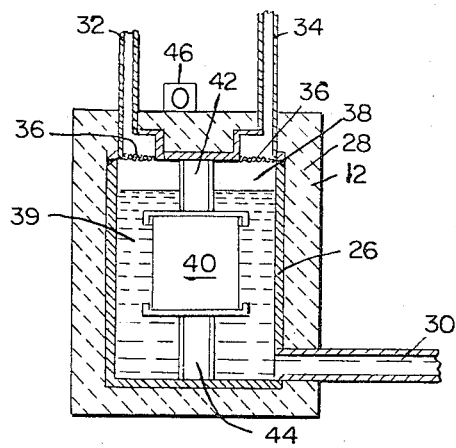
FIG. 3 is a view in side elevation, partly in section, of the fluid generator.

The boiler, 12, is of the enclosed type and as illustrated in FIG. 3, is of the direct conduction type with stainless steel walls, 26, and layers of insulation, 28, the outer surface thereof. A feed line, 30, is positioned at on near the lower portion of the boiler, and vapor lines, 32, 33, 34 and 35 extend upwardly from the upper surface, having suitable screening, 36, positioned in the entrance to the vapor lines. Positioned within the fluid chamber, 38, and completely surrounded by the working fluid, 39, is an isotope fuel capsule, 40, which is hermetically sealed and maintained in a central position within the fluid chamber, 38, by means of supports 42 and 44. A pressure indicator, 46, is located on the top of the boiler, 12, and indicates the boiler pressure on a vernier scale on the plunger in the usual manner.

Figure 5:
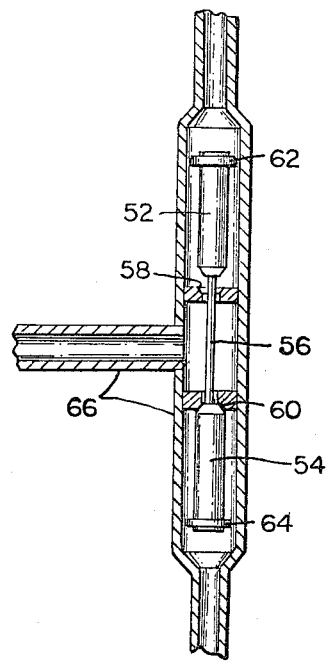
FIG. 5 is a top plan view of the float controlled check valve T.

The four vapor lines, 32, 33, 34 and 35, carrying the working fluid in the vapor phase from the boiler, 12, are interconnected through a series of three (3) float controlled check valves These are as shown in FIG. 5, and consist of two floats, 52 and 54, connected by a rod, 56, two (2) valve seats, 58 and 60, and two (2) sets of float guides, 62 and 64, all contained within a T housing, 66. The rod 56, connecting the two floats, 52 and 54, is longer than the distance between the valve seats, 58 and 60 and therefore, ensures that at least one of the two valves must be biased open at all times.

The dry pipe, 68, from the third float controlled check valve, 50, is connected to a pressure relief valve, 70, which consists of an adjustable, spring loaded needle valve, which is normally biased partially open. There are two lines, 72 and 74, from the pressure relief valve, 70. Line 72 is connected to the auxiliary condenser, 22, for a purpose to be set forth more fully hereinafter, and line 74 is connected through the manually adjustable throttling valve, 76, to the expander, 14. The throttling valve, 76, is mounted within a separate housing, 75, which also contains the cyclic rate indicator, 77, and has provisions for adjusting the throttling valve, 76, by means of the knob, 79.

Figure 1:
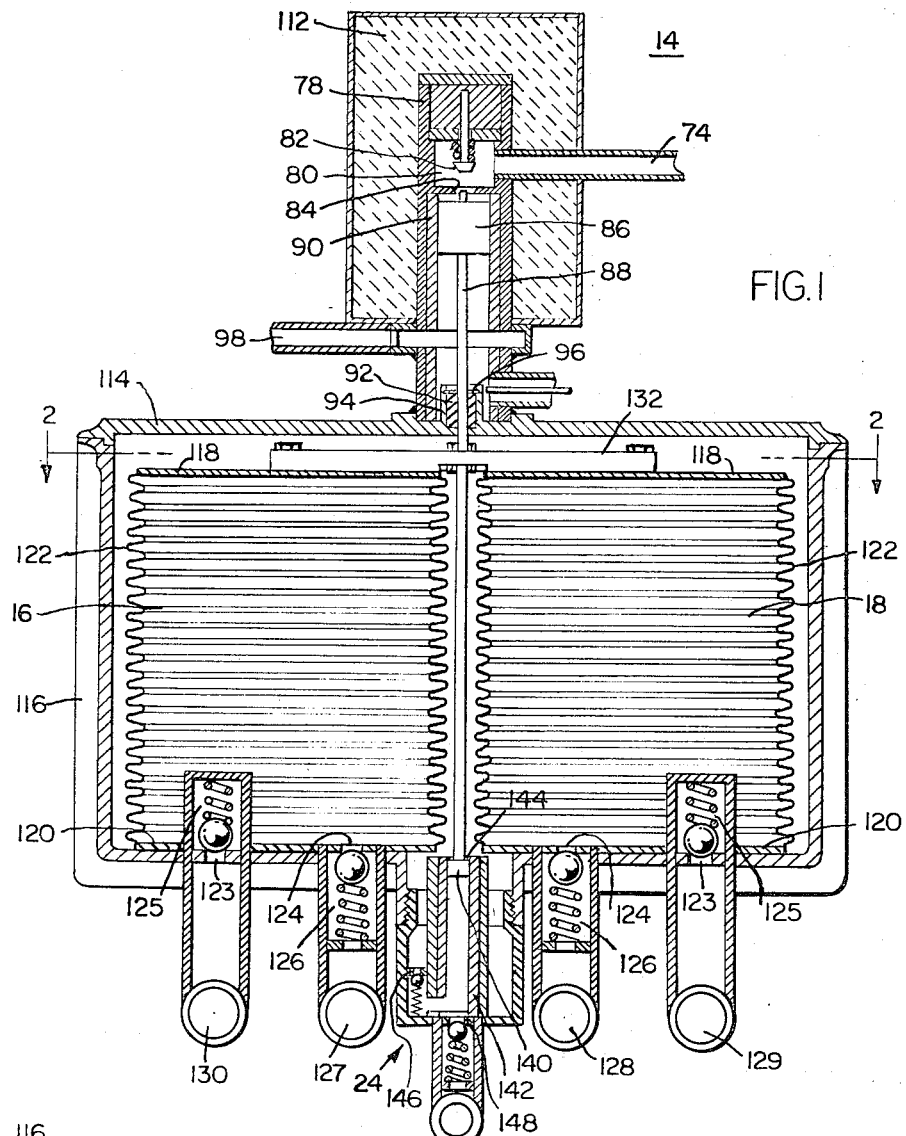
FIG. 1 is a view in section of the prime mover and main bellows pumps.
Figure 10:
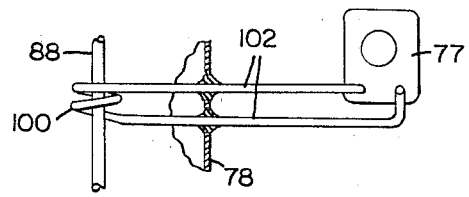
FIG. 10 is a view in section of the control sensor, or cyclic rate sensor.

As shown in FIG. 1, the expander, 14, consists of a stainless steel housing 78, with a steam chamber 80, an inlet valve 82 and an inlet valve seat, 84, a piston, 86, with a fixed connecting rod, 88, a graphite liner, 90, around the piston, 86 and contained within the cylinder 78; a graphite bushing, 92, around the fixed connecting rod, 88, to provide a vapor-seal, a retainer cup, 94, and a locking ring, 96, for the graphite bushing, 92. The steam inlet line, 74, leads into the steam chamber, 80 and the exhaust ports and line 98, are located approximately at "bottom-dead-center," to permit exhausting of the working fluid. The cyclic rate of the reciprocating motion of the expander is determined by the apparatus as illustrated in FIG. 10.

Figure 4:
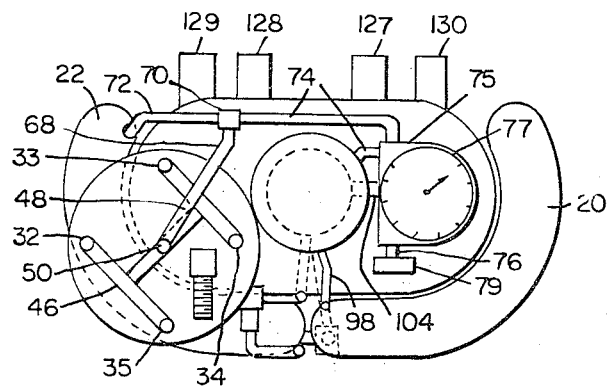
FIG. 4 is a top plan view of the mechanical heart.

A portion of the connecting rod, 88, between the piston, 86, and the blood pump cross-bar, 132, is constructed of materials having magnetic qualities. Disposed concentrically around connecting rod, 88, and below the exhaust ports, 98, is a coil of electrically conducting wire, 100, which is connected to the two terminals of the electrical leadthrough, or press, 102, in the cylinder wall of the expander, 14, which is hermetically sealed to the walls, 78, of the expander, 14. The other end of the terminals of the press, 102, are connected to the terminals of the cyclic rate indicator, 77, mounted in the adjacent housing, 75, passing through the interconnecting tubing, 104 as shown in FIG. 4.

As shown in FIG. 1, the housing of the expander, 78, is enclosed with thermal insulation material, 112, forming the exterior surface thereof. The expander, 12, is mounted on the top of the housing of the blood pumps, 114, and hermetically sealed to it.

Figure 2:
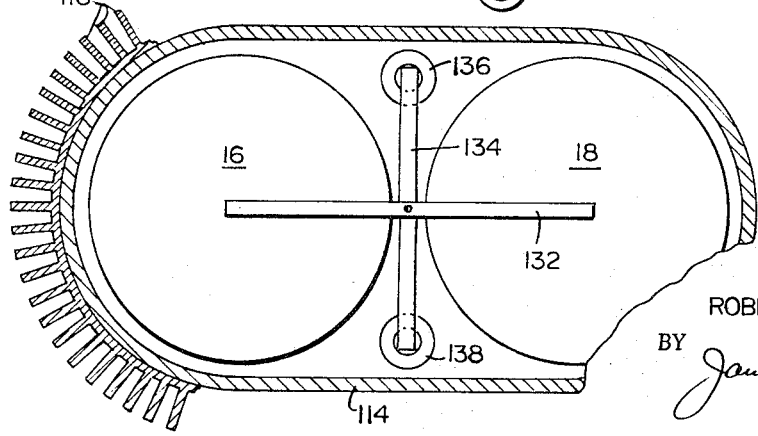
FIG. 2 is a view in section taken as line 2—2 of FIG. 1.

The two blood pumps, 16 and 18, are contained within a housing, 114, the outer surface of which has a plurality of convection cooling fins, 116. Each blood pump consists of an upper and lower end plate, 118 and 120, respectively, connected at their outer periphery through a bellows, 122, made of or lined with a smooth surfaced material such as a pliable synthetic. Positioned so that they extend through the fixed bottom plates, 120, of the blood pumps, 16 and 18, are an inlet, 123, and an outlet, 124; fittings with check valves, 125 and 126, providing for unidirectional flow through the pumps. The check valves, 125 and 126, are spring loaded ball valves, normally biased closed. The blood can flow through each valve only when there is a pressure differential across the ball valve seat such as to compress the coil spring. The coupling, 127, is the pulmonary artery attachment; the coupling, 128, is the aorta attachment; the coupling, 130, is the vena cava attachment; the coupling, 129, is the pulmonary vein attachment. Connected at the top, center of the upper plate, 118, of each blood pump is a beam, 132, common to both blood pumps, which is connected at its center to the fixed connecting rod, 88, extending from the piston, 86, in the expander, 14. As shown in FIG. 2, the beam, 132, is also connected at right angles to a second beam, 134, to which are connected two coil springs, 136 and 138, so that the coil springs are compressed when the piston, 86, travels from "top-dead-center" toward "bottom-dead-center." The piston connecting rod, 88, extends to the bottom of the blood pump housing 114, between each of the pumps 16 and 18 to a feed water pump, 24. The fluid line, 154, from the auxiliary condenser, 22, also flows into the feed pump, 24, as shown in FIG. 6. The outlet line, 156, from the feed pump, 24, leads to the check valve, 158, which contains not only a check valve but also a pressure by-pass. Line 160, leads back to the inlet side of the feed pump, 24. The other outlet, 162, from the check-valve, 158, leads to the feed line, 30, to the boiler, 12.

Figure 11:
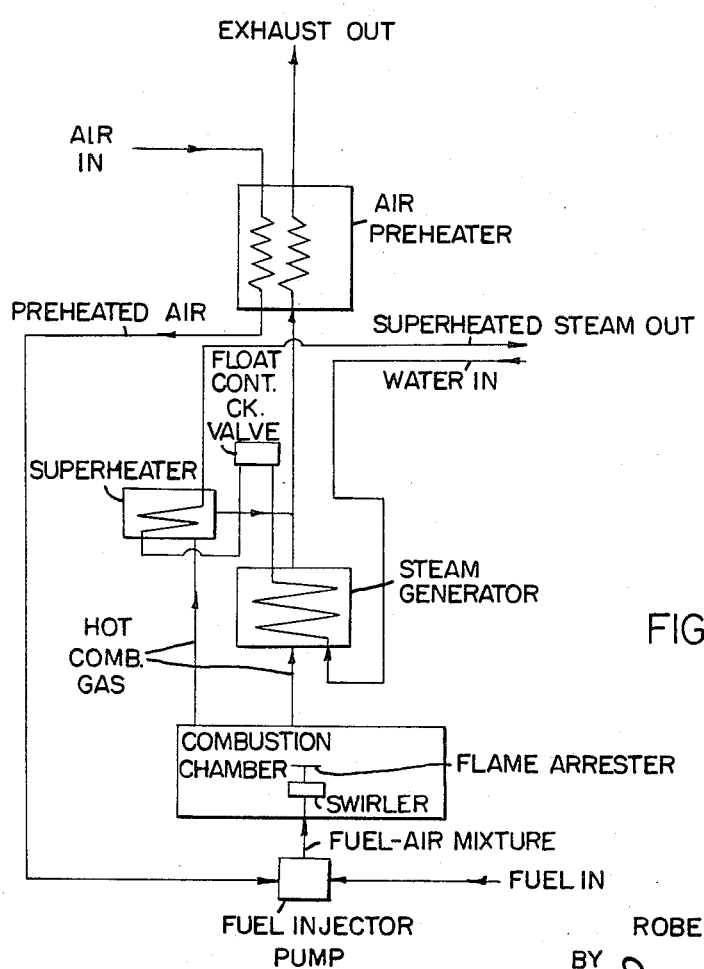
FIG. 11 is a schematic block diagram of the modified form of the boiler.
Figure 12:
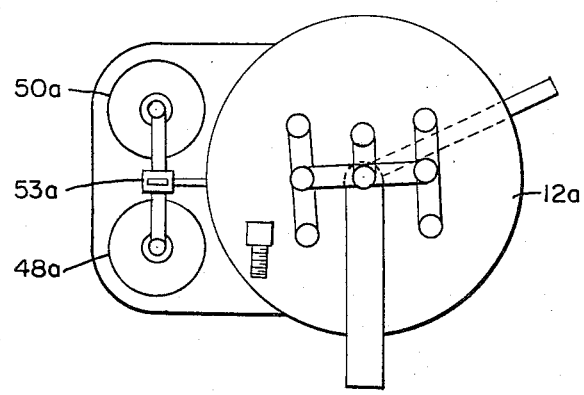
FIG. 12 is a top plan view of a modified form of the boiler.

In addition to the use of the radioisotope-fueled boiler, it is possible to use a chemically fueled boiler-burner in lieu of the isotope fueled one described above, as the energy source for the mechanical heart. The schematic of the modified form of the boiler-burner is shown in FIG. 11. The chemically fueled boiler-burner is shown in section in FIG. 13.

The boiler, 12a, of this modified form consists of an air intake manifold, 14a, an air preheater, 16a, a passage for the preheated air, 18a, a fuel injector jump, 20a, a fuel-air swirler, 22a, a combustion chamber, 24a, a combustion chamber top with orifice ports, 26a, a steam generator section, 28a, superheater section, 30a, first collector plate with orifice ports, 32a, exhaust stack, 38a, inner insulation, 40a, outer insulation, 42a, fuel feed line, 44a, fuel regulator, 46a, fuel cartridges, 48a and 50a, fuel cartridge supports, 51a and 52a, automatic T valve, with indicator, 53a, boiler pressure indicator and safety release valve, 54a. The boiler burner is of cylindrical symmetry, with the combustion chamber in the center and successively lower temperature sections around the combustion chamber. The construction is essentially of stainless sheet metal and tubing, and thermal insulation material. All flow passages have continuous welded seams, which also provide much of the structural support.

The operation of the mechanical heart will now be described in view of the above description. The radioisotope, 40, in the boiler, 12, heats the working fluid until it attains its operating temperature and pressure, where it is maintained throughout the life of the unit. The working fluid, in the vapor phase, flows from the boiler through a series of float-controlled check valves, 46, 48 and 50, pressure relief valve, 70, and manually adjustable throttling valve, 76, to the steam inlet line 74, to the expander, 14. The working fluid is admitted to the expansion chamber through the intake valve opening, 84, where it expands thus performing work on the piston, 86. The piston is connected to the beam, 132, and a feed pump piston, 140. The working fluid is exhausted through an exhaust line, 98, to the main condenser, 20, where it is condensed to the liquid phase. From the main condenser, 20, the liquid phase of the working fluid flows to the inlet of the feed pump, 24, where it is pumped back into the boiler, 12, to complete the cycle. The beam assembly, 132, actuates two blood pumps, 16 and 18, and two spring assemblies, 136 and 138. The reciprocating motion of the connecting-rod, 88, and beam, 132, assembly causes the blood to be pumped through the two separate blood pumps, 16 and 18. The blood flows into fitting, 129, from the pulmonary vein, and is pumped out through fitting, 128, to the aorta artery with sufficient pressure to circulate the blood throughout the human body. Likewise, blood flows into fitting, 130, from the vena cava veins which collect blood from the body, and is pumped out fitting, 127, to the pulmonary artery with sufficient pressure to circulate it through the lungs and return to the other side of the pump, 129. The excess kinetic energy of the beam assembly, 132, is stored as potential energy in the two spring assemblies, 136 and 138. This potential energy is required to ensure the return of the piston to top dead center during the compression stroke.

The isotope heat source, 40, will have excess thermal power output early in the design life of the unit. Therefore, the pressure will tend to increase over the design pressure. However, the pressure relief valve, 70, opens releasing a portion of the working fluid to line 72, to the auxiliary condenser, 22, thus maintaining the boiler, 12, at its design pressure. The condensed working fluid in the auxiliary condenser flows out line, 154, to the T fitting, 152, where it joins with the working fluid from the main condenser, 20, and flows into the feed pump, 24, where it is pumped back into the boiler. The T fitting, 152, has check valves on the coupling to both lines 154 and 150.

If for any reason the boiler pressure tends to fall below its design pressure, the valve, 158, will be actuated and the return liquid phase of the working fluid from the feed pump will be recirculated back into the inlet of the feed pump through line 160, rather than flowing into the boiler. There is a check valve in the T fitting, 164, where line 160 joins line 150 to the inlet of the feed pump, 24, to prevent reverse flow.

The connecting rod of the piston, 86, of the expander, 14, actuates a cyclic rate detector to indicate the pumping or beat rate of the pumps on the cyclic rate indicator, 77. This is used in conjunction with the adjustable throttling valve, 76, to permit variations in the pumping rate of the blood pumps.

The sensor consists of a coil of electrically conducting wire, 100, which is looped around the connecting rod, 88, which is made of material having magnetic qualities. Due to the reciprocating motion of the piston, 86, through the fixed coil, 100, it will cut the lines of magnetic flux set-up by the permanent magnet, thus inducing an electromotive force across the coil, 100.

The voltage across the coil is equal to the negative product of the number of turns in the coil and the rate of change of flux. The rate of change of flux is directly proportional to the rate of the reciprocating motion of the piston in the expander, and the voltmeter reading is directly proportional to the rate of the reciprocating motion of the piston and blood pumps. Since the motion is reciprocating, the induced E.M.F. is alternating current, and the voltmeter is an A-C meter. The scale on the face of the A-C voltmeter is calibrated in beats per minute.

Figure 13:
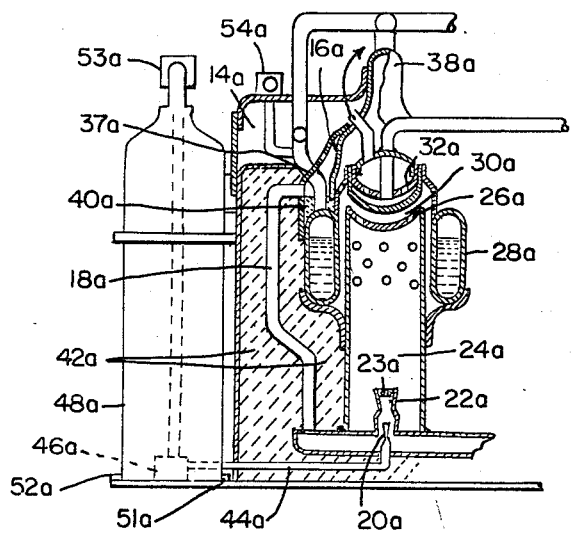
FIG. 13 is a partial view in side elevation, partly in section, of the chemically fueled boiler-burner.

The modified form of the boiler consists of a chemically fueled burner-boiler, as shown schematically in FIG. 11, and in section in FIG. 13. In particular, the use of gaseous hydrocarbon fuels is considered in detail in the design of the modified boiler-burner.

Air enters through the air intake manifold, 14a, and is accelerated through the orifice ports in the second collector plate, 37a, and strikes the air preheater section, 16a, where the temperature of the air is increased. The heated air flows down the preheated air passage, 18a, where it is accelerated through the nozzle of the fuel injector pump, 20a, and the proper proportion of fuel is added. The fuel-air mixture then flows through a swirler, 22a, where the fuel and air are uniformly mixed, and is discharged from the swirler through a fine wire mesh screen, 23a, which acts as a flame arrestor. The fuel-air mixture enters the combustion chamber, 24a, where complete combustion takes place. The hot combustion gases are then accelerated through the orifice ports in the combustion chamber top plate, 26a. Those ports around the side of the top plate, permit the hot gases to strike the walls of the steam generator section, 28a, while those on the top of the top plate accelerate the gases against the superheater section, 30a, which is a container with an inner container also with orifice ports to accelerate the superheated steam vapor against the outer container wall. The working fluid absorbs sufficient heat in the steam generator to convert a portion of the working fluid to saturated vapor, while in the superheater, the saturated vapor is superheated to the design operating temperature. The hot gases from both sets of orifice ports in the combustion chamber top plate are accumulated below the first collector plate, 32a, and accelerated through the orifice ports, striking the inner surface of the air preheater, 16a. The working fluid from the feed pump, 24, flows successively through the steam generator section, 28a, the superheater section, 30a, and out the dry pipe, 68. The spent combustion gases then flow out the exhaust stake.

The gaseous hydrocarbon fuel is contained in two cartridges 48a and 50a, under pressure. The outlet from both fuel cartridges is connected to the automatic T valve, 53a. The automatic T valve ensures that when the pressure in one cartridge falls below a predetermined level, the valve automatically switches in the other cartridge, thus permitting the first cartridge to be refueled. The fuel line, 44a, from the automatic T valve, carries the fuel through the fuel regulator, 46a, and into the fuel injector pump, 20a. The fuel regulator, 46a, has both a manual adjustment and an automatic control based upon boiler pressure. The manual adjustment is made during a calibration when the unit is tested, and is not adjusted thereafter. The automatic control is actuated by the boiler pressure.

While there have been described herein what are at present considered to be preferred embodiments of the invention, it will be obvious to those skilled in the art that modifications and changes may be made without departing from the essence of the invention. It is therefore to be understood that the exemplary embodiments are illustrative and not restrictive of the invention, the scope of which is defined in the appended claims and that all modifications that come within the meaning and range of equivalency of the claims are intended to be included herein.

What is claimed is:

1. A prosthetic device for use with the blood circulatory system of a living organism, said device including a housing containing,
   (A) a vapor generator having a self-contained integral energy radioisotope source,
   (B) a prime mover in connection with said generator,
   (C) means extending from said prime mover in engagement with blood pump means having,
   (D) a plurality of inlet and outlet means adapted to connect the blood pump means to the circulatory system,
   (E) said pump means movable in response to the prime mover, whereby the pump means will maintain proper cardiac output and arterial pressure within the circulatory system 2. A mechanical prosthetic device for use with the circulatory system of a living organism, and for implantation therein containing a housing with; a vapor generator having a radioisotope energy source, a prime mover operative by said vapor exhausting to a closed condensing system, a blood pump movable in response to said prime mover having internal valves controlling the flow of blood through connective means to the circulatory systeam of the organism, and means for controlling said prime mover.

3. A mechanical heart for use with the circulatory system of a living organism, said heart including in combination:
   (A) a vapor generator containing a hermetically sealed radioisotopic energy source;
   (B) dry pipe means for conveying vapor to an expander, said expander comprising a prime mover for conversion of fluid pressure to work;
   (C) a closed condensing system connected to said expander,
   (D) a pair of pumps enclosed within a housing and operative in response to said expander;
   (E) said pumps being normally spring biased in the direction of said expander;
   (F) inlet and outlet means on said pump adapted to connect with the circulatory system of the organism;
   (G) and sensor means for indicating the cyclic rate of the expander, and
   (H) means for controlling the rate of work of said expander.

4. An artificial heart comprising:
   (A) a housing;
   (B) said housing containing a radioisotope power source;
   (C) means for converting thermal power generated by said power source to mechanical power;
   (D) means for pumping blood responsive to said mechanical power;
   (E) means for connecting said means for pumping to a mammalian circulatory system, whereby the cardiac output is varied.

5. A prosthetic device for use with the blood circulatory system of a living organism comprising a housing containing a radioisotope power source, a prime mover, means integral with the prime mover in direct engagement with pumping means and responsive thereto, a plurality of outlet and inlet means integral within said pump means, one of said inlet means adapted for attachment to the pulmonary vein, another of said inlet means adapted for attachment to the vena cava and one of said outlet means adapted for attachment to the pulmonary artery, and another of said outlet means adapted for attachment to the aorta, wherein the said prime mover will in response to suitable stimuli, circulate blood through a living organism.

6. A prosthetic device for use with the circulatory system of a living organism, said device including in combination: a vapor generator, means for supplying energy to said generator, dry pipe means to conduct vapor under pressure to an expander converting vapor pressure to work, said expander having rod means connected to a beam, said beam movable in response to said expander, said beam being integral with a pair of pump means enclosed within a housing, connective means establishing continuity between the inlet and outlet means of said pump means to a circulatory system, said inlet means adapted for attachment to the pulmonary vein and vena cava, said outlet means adapted for attachment to the pulmonary artery and aorta, said pump means each having an inlet and outlet adjacent the lower surface thereof, valve means in said inlet and outlet governing the flow of circulatory fluid; said rod means extending from said expander between the pump means to a feed pump plunger, condenser means adapted to receive vapor from said expander for return to the vapor generator, and means for controlling the rate of work of the expander.

7. A prosthetic device for use wtih the circulatory system of a living organism, said device including in combination: a steam generator having a radioisotopic energy source, dry pipe means for conveying steam to an expander having a closed condensing system said expander comprising a prime mover for converting fluid pressure to work, said expander having shaft means adapted to alternatively expand and contract a plurality of bellows pumps, said blood pumps enclosed within a housing adapted for continuity with portions of the circulatory system, said blood pumps having inlet means adapted to be connected to the pulmonary vein and vena cava, and outlet means adapted to be connected to the pulmonary artery and aorta, and means for controlling the rate of work of said expander whereby normal circulatory processes within the organism may be maintained.

8. A mechanical heart for use with the circulatory system of a living organism, said heart including in combination a housing containing: a vapor generator containing a hermetically sealed radioisotopic energy source, a plurality of vapor lines extending from a vapor chamber of said generator, said vapor lines interconnected with each other through a series of float controlled check valves; a reciprocating vapor expander having a piston and connecting rod, utilizing vapor from said generator and exhausting to a closed condensing system, a pair of blood pumps, both operative in response to movement of said expander, said pumps having inlets and outlets establishing continuity with the circulatory system, sensor means for indicating the cyclic rate of the said expander and means for controlling the rate of work of the expander.

9. A mechanical heart as set forth in claim 8 where said radioisotopic energy source is not constant and relief valve means are provided on said steam generator to relieve initial excessive pressure to said closed condensing system.

10. A mechanical heart as set forth in claim 8 when said condensing system includes a main condenser, an auxiliary condenser and a feed pump, said feed pump defining an extension of said expander and operative in direct response to the movement thereof.

11. A mechanical heart as set forth in claim 8 when said sensor means includes a coil concentrically disposed around, but spaced from the connecting rod of said expander, whereby movement of said connecting rod will induce an electromotive force across said coil.

12. A mechanical heart for use with the circulatory system of a living organism, said heart including in combination: a vapor generator, having a chemical energy source, means to convert said chemical energy into heat, a plurality of vapor lines extending from a chamber of said containing generator a working fluid operating according to a thermodynamic cycle to a reciprocating expander having a piston and connecting rod, a closed condensing system, for receiving the exhaust from said expander a pair of blood pumps, both operative in response to movement of said expander, said pump being interconnected with the circulatory system of an organism, sensor means for indicating the cyclic rate of said expander and means for controlling the rate of work of the expander.

References Cited
UNITED STATES PATENTS

| | | | |
|---|---|---|---|
| 1,093,145 | 4/1914 | Pagel | 60—95 |
| 3,152,340 | 10/1964 | Fry et al. | 3—1 |
| 3,206,768 | 4/1965 | Preston | 3—1 |

DALTON L. TRULUCK, *Primary Examiner.*